Feb. 24. 1925.  
W. KLOCKE  
1,527,197  
FRICTION DISK FOR CLUTCHES OR THE LIKE  
Original Filed March 26, 1921   2 Sheets-Sheet 1
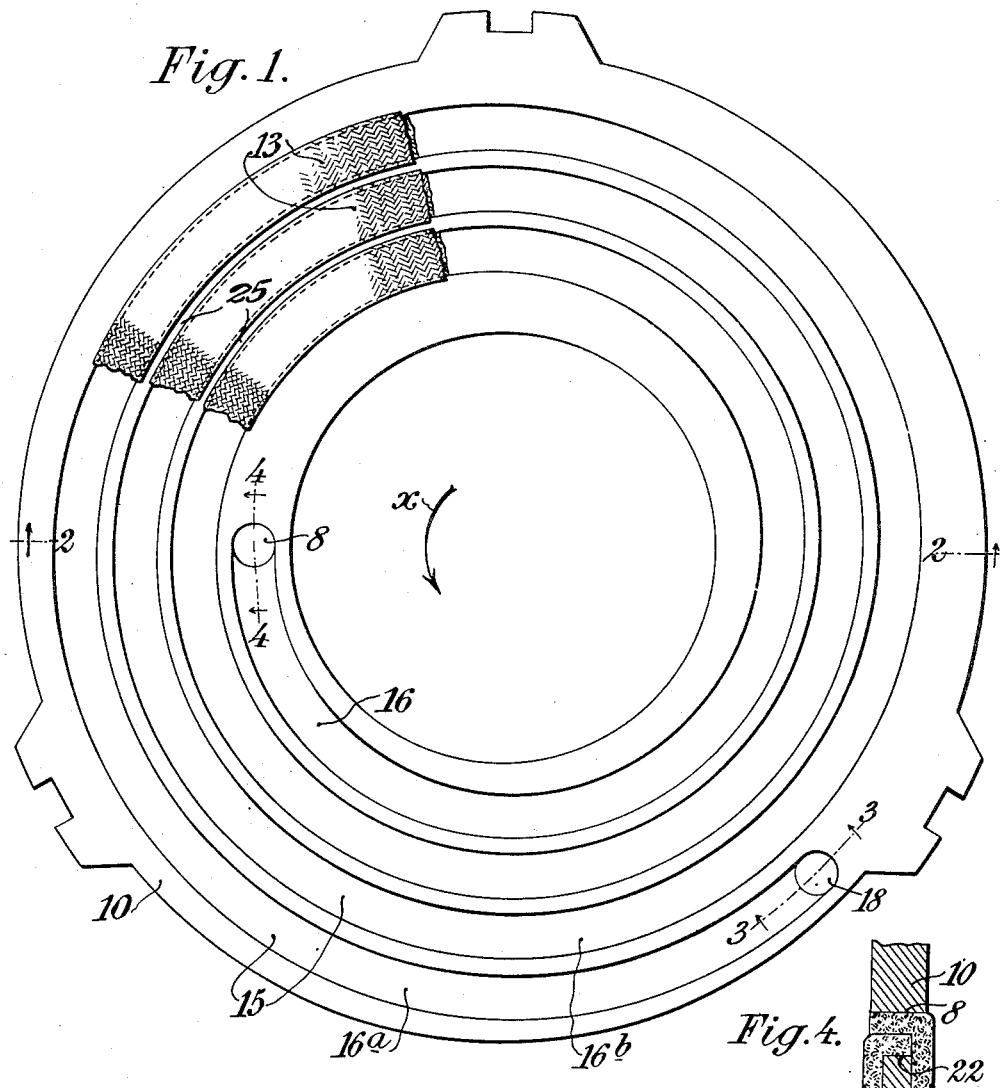
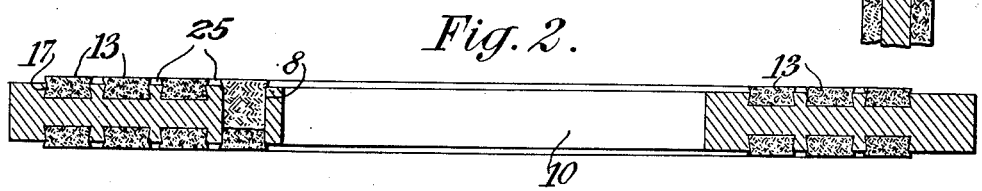
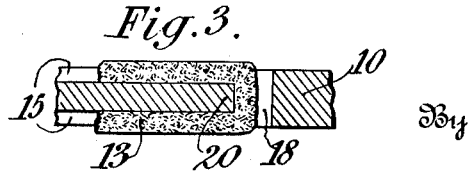
Inventor:  
William Klocke,  
By Attorneys,  
Fraser, Turk & Myers Feb. 24. 1925.
W. KLOCKE
1,527,197
FRICTION DISK FOR CLUTCHES OR THE LIKE
Original Filed March 26, 1921  2 Sheets-Sheet 2
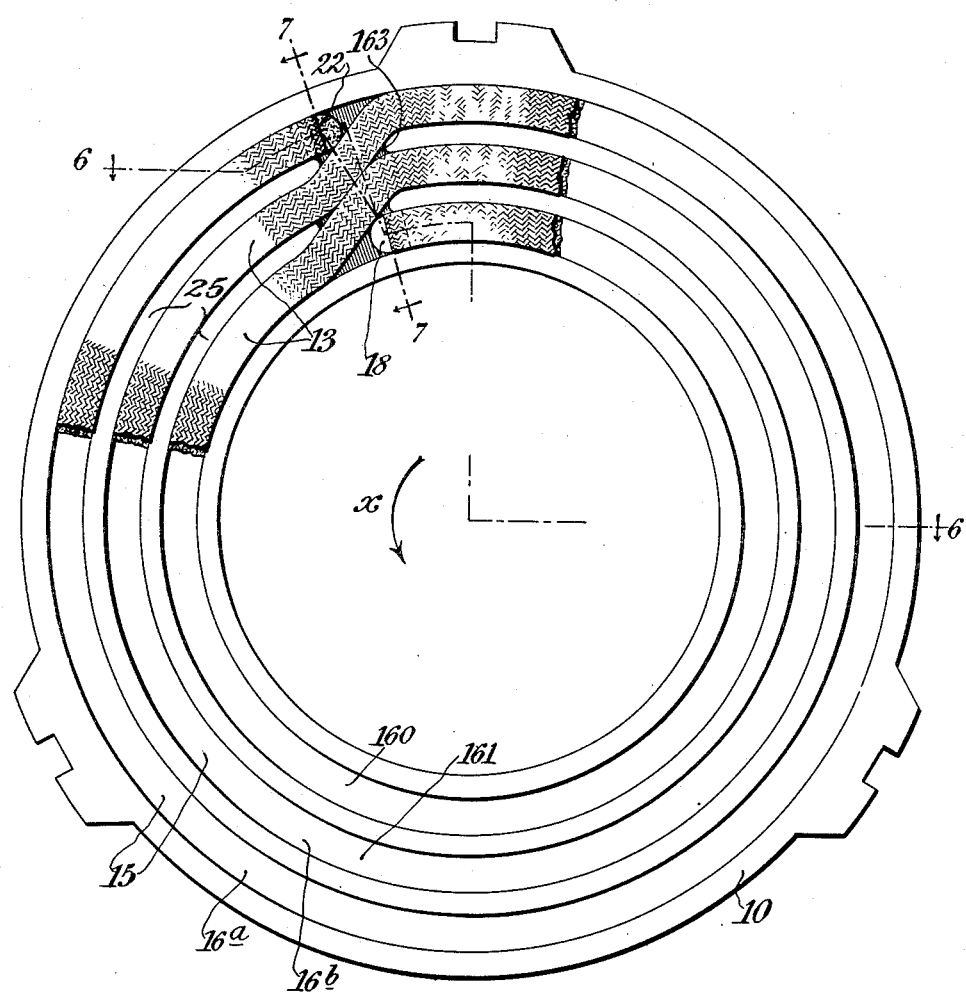
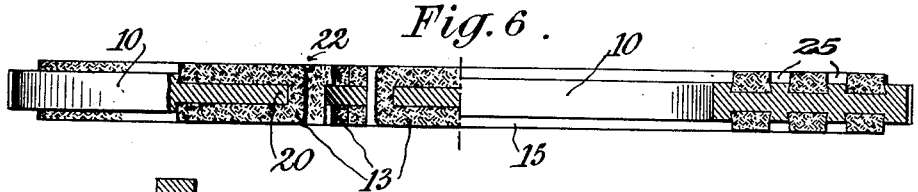
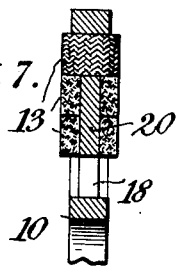
Inventor
William Klocke,
By Attorneys,
Fraser Turk & Myers Patented Feb. 24, 1925.

1,527,197

UNITED STATES PATENT OFFICE.

WILLIAM KLOCKE, OF WOODHAVEN, NEW YORK, ASSIGNOR TO E. W. BLISS COMPANY, OF BROOKLYN, NEW YORK, A CORPORATION OF WEST VIRGINIA.

FRICTION DISK FOR CLUTCHES OR THE LIKE.

Application filed March 26, 1921, Serial No. 455,716. Renewed December 26, 1924.

*To all whom it may concern:*

Be it known that I, WILLIAM KLOCKE, a citizen of the United States of America, residing in Woodhaven, in the borough and county of Queens, city and State of New York, have invented certain new and useful Improvements in Friction Disks for Clutches or the like, of which the following is a specification.

This invention relates to friction disks for friction clutches, or the like, and aims to provide improvements therein.

The invention provides a disk, wherein the friction material is of a character and form which is easily made, or procured, which admits of simple, expeditious, and effective application to the disk, and which stands well under ordinary conditions of use.

The invention, therefore, provides a friction disk giving more satisfactory service than those previously in use, and further admits of considerably greater ease and economy of manufacture.

The invention further provides a disk, which in combination with its associated clutch parts, admits of efficient dissipation of the heat generated by the friction of the clutch parts in clutching.

Two embodiments of the invention are illustrated in the accompanying drawings, wherein:

Figure 1 is a side elevation (with part of the friction material omitted) of a friction disk such as ordinarily employed in a friction clutch.

Fig. 2 is a view, in cross-section, on the line 2—2, Fig. 1.

Fig. 3 is a view, in section, of a part of the disk, on the line 3—3, Fig. 1; and Fig. 4 is a similar view, on the line 4—4, Fig. 1.

Fig. 5 is a view, similar to Fig. 1, of a second embodiment of friction disk, and Figs. 6 and 7 are sectional views, on the lines 6—6 and 7—7, Fig. 5.

In said drawings, numeral 10 designates the disk proper, 13 the friction material, and 15 a channel (or channels), running around the face of the disk, conveniently in the form of a groove cut into the disk 10, in which the friction material 13 is partially contained. The chanel 15 is preferably in the form of a plurality of convolutions $16^a$, $16^b$, etc., one included in the circumference of the other, and are conveniently undercut, as indicated at 17. As shown in Figs. 1–4, inclusive, the convolutions may be a regular spiral or coil, or, as shown in Figs. 5 to 7, inclusive, may be in the form of an irregular spiral or coil. The irregular spiral may be conveniently formed of a plurality of circular grooves 160, 161, etc., with cross-grooves 163 through the wall between contiguous circular grooves, as shown in Fig. 5.

The plural convolutions admit of the use of packing material 13, in strip form, conveniently in a single strip the length of the convolutions.

The channel 15, moreover, is preferably duplicated on the opposite face of the disk, and the two channels are preferably symmetrical.

At one end of the channel, preferably that in the direction of the frictional drag on the friction-material in the channel, there is formed a hole or opening 18 through the disk, joining one channel with the other. Where the friction-disk is a part of the driven member of a clutch, the rotation would be in the direction of the arrow $x$. Preferably, moreover, the packing strip 13 is of a length equal to the combined length of the channels (spiral or otherwise) in the two sides of the disk, and the packing strip is passed through the hole 18, so that one-half its length is on each side of the disk, and the two halves then put into the channels. The frictional drag or pull on the friction strip is thereby transmitted to the bend in the strip, as indicated at 20, and borne by the disk 10 on the inner wall of the hole 18. Moreover, any buckling tendency of the packing strip 13 is offset by the tendency of the strip to move along the channel or groove 15, and, consequently, the conditions are favorable to the surface of the friction material being smooth and level.

The friction material strip 13 is preferably of a character or form to have a moderate degree of tensile strength, and is conveniently a rope or strap of woven asbestos cords.

In applying the friction material 13 to the disk, the channel or channels 15 are conveniently first coated with an adhesive, and, after the friction material is put into the channels, it is beaten into the channels with a mallet, or placed under a weight, or compressed in a press, no great accuracy or care being required in the form of the friction material strip 13, or channels 15, or in the act of putting the friction material into the channels.

A hole, or recess, 22 is conveniently formed in the disk at the end of the channel or channels, 15, opposite the hole 18, and the end or ends of the frictional material strip 13 may be fastened therein, by forcing said end, or ends, in said hole, for example.

The space 25 between the convolutions of the strip 13 provides an air duct which is opened at one or both ends, and thus provides an outlet for the expansion of the heated air and for a flow under the centrifugal force which is imparted to the air by the rotation of the disk, or under such other moving force as may be present, thus serving to efficiently dissipate the heat of friction generated by said disks. Moreover, the relatively large surface of the strip 13 in contact with the air serves to efficiently dissipate the heat from said strip 13, thus prolonging its usefulness, owing to it working at a lesser mean temperature than would otherwise be the case.

The invention may be embodied variously otherwise than as herein specifically illustrated and described.

What is claimed is:—

1. A friction disk having a convolute channel running around its face, and a strip of friction material in said channel, said strip lying substantially flat in said channel, from end to end thereof and projecting substantially above the face of said disk, whereby a complementary flat disk may contact with said friction material.

2. A friction disk having a channel running around its face, and a strip of friction material in said channel, said channel being substantially convolute, said strip lying substantially flat in said channel, from end to end thereof.

3. A friction disk having a channel running around its face, and a strip of friction material in said channel, said channel being in the form of two or more circles, joined by a cross groove, said strip lying substantially flat in said channel, from end to end thereof.

4. A friction disk having a channel in each face, and a strip of friction material in said channels, said channels being in the form of convolutions symmetrical on the two faces of the disk, said strip lying substantially flat in each of said channels, from end to end thereof.

5. A friction disk having a channel in each face, and a strip of friction material in said channels, said channels being in the form of convolutions symmetrical on the two faces of the disk, and said strip of friction-material passing from one face of said disk to the other, and said strip lying substantially flat in each of said channels, from end to end thereof.

6. A friction disk having a channel in each face, and a strip of friction material in said channels, said channels being formed in two faces of said disk, and said strip lying substantially flat in each of said channels, from end to end thereof.

7. A friction disk having a channel in each face, and a strip of friction material in said channels, said channels being formed in two faces of said disk, and said strip of friction-material lying substantially flat in each of said channels, from end to end thereof, and passing from the channel in one face of said disk to the other channel.

8. A friction disk having a convolute channel running around its face, and a strip of friction material in said channel, said strip of friction material having tensile strength, whereby it may be tensioned by the resistance of the part against which it rubs, and lying substantially flat in said channel, from end to end thereof.

9. A friction disk having a strip of friction material wound in a convolute around said disk on a face thereof.

10. A friction disk having a strip of friction material wound around said disk on a face thereof, said strip being wound in a plurality of convolutions.

11. A friction disk having a strip of friction material wound around said disk on a face thereof, said strip being wound in a plurality of convolutions, and an air space between said convolutions adapted to permit the flow of air to an edge of said disk.

12. A friction disk having convolutions of friction material on its face, and air ducts between said convolutions for effecting the cooling of said friction material.

13. A friction disk having a channel running around its face, friction material in said channel, said channel having a plurality of convolutions, said friction material projecting beyond the surface of said disk and leaving air ducts between said convolutions for the flow of air, whereby to effect cooling of said friction material.

In witness whereof, I have hereunto signed my name.

WILLIAM KLOCKE.